United States Patent [19]

Ohsugi et al.

[11] Patent Number: 5,338,799
[45] Date of Patent: Aug. 16, 1994

[54] CURING TYPE RESIN COMPOSITION

[75] Inventors: Hiroharu Ohsugi; Keita Mizutani, both of Osaka, Japan

[73] Assignee: Nippon Paint Co. Ltd., Osaka, Japan

[21] Appl. No.: 993,023

[22] Filed: Dec. 18, 1992

[30] Foreign Application Priority Data

Dec. 27, 1991 [JP] Japan .................. 3-346690

[51] Int. Cl.$^5$ ........................... C08L 43/00
[52] U.S. Cl. .................... 525/123; 525/160; 525/205; 525/209; 526/279; 528/25; 528/26; 427/387
[58] Field of Search ............ 525/101, 160, 479, 103, 525/123, 205, 209; 526/279; 528/25, 28; 427/387

[56] References Cited

U.S. PATENT DOCUMENTS

| | | | |
|---|---|---|---|
| 4,564,557 | 1/1986 | Ohgushi et al. | 526/279 |
| 4,693,935 | 9/1987 | Mazurek | 526/279 |
| 4,972,005 | 11/1990 | Aoki et al. | 522/99 |
| 5,051,473 | 9/1991 | Tabuchi et al. | 525/100 |
| 5,079,312 | 1/1992 | Isozaki et al. | 525/479 |
| 5,166,265 | 11/1992 | Nakahata et al. | 525/101 |

FOREIGN PATENT DOCUMENTS 0159894 10/1985 European Pat. Off.
0449613 10/1991 European Pat. Off.

*Primary Examiner*—Ralph H. Dean
*Attorney, Agent, or Firm*—Beveridge, DeGrandi, Weilacher & Young

[57] ABSTRACT

A curing type resin composition used as a molding material, a paint binder, etc. comprises a curing agent and a copolymer composed of a silicone compound and an $\alpha,\beta$-unsaturated vinyl monomer. The silicone compound is selected from the group consisting of silicone compounds having the following general structural formulas (1) and (2) respectively, and the curing agent has at least two functional groups, individual molecules of which react with a functional group in the groups Y of the silicone compound.

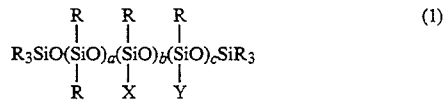

(1)

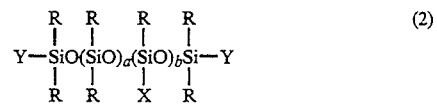

(2)

wherein:
X is selected from the group consisting of a 3-acryloxypropyl group and a 3-methacryloxypropyl group;

Y is selected from the group consisting of a 3-glycidoxypropyl group; a 2-(3',4'-epoxycyclohexyl)ethyl group; a 3-hydroxypropyl group; a 3-(2'-hydroxyethoxy)propyl group; and a 3-(4'-(3',3'-dihydroxymethyl)butoxy)propyl group, R is selected from the group consisting of a phenyl group and an alkyl group having 1 to 6 carbon atoms; and a, b, and c are numbers in the following ranges:

$1 \leq a \leq 20$ $0.5 \leq b \leq 2$ $1 \leq c \leq 10.$

24 Claims, No Drawings

CURING TYPE RESIN COMPOSITION

BACKGROUND OF THE INVENTION

The present invention relates generally to a resin composition, and more particularly, to a curing type resin composition.

A resin composition comprising a silicone-modified acrylic resin and a curing agent is widely known as a curing type resin composition. This type of resin composition is suitable for use as a coating material such as a paint, or as a molding material, since the resin composition forms a cured resin with the combined characteristics of heat-resistance, water repellency, weatherability, and high mechanical strength imparted by the modified acrylic resin.

The silicone-modified acrylic resin which composes the resin composition is generally a silicone-graft acrylic resin obtained by copolymerization of polydimethylsiloxane macromonomers having polymerization radical groups. Japanese Laid-Open Patent Application Nos. 154766/1983, 20360/1984 and 126478/1984, for example, disclose that the inclusion of the foregoing silicone-graft acrylic resin in a coating material composition improves such characteristics as water repellency, oil repellency, contamination-resistance and abrasion-resistance. Japanese Laid-Open Patent Application Nos. 156172/1987, 1772/1989, 1773/1989 and 4670/1989 teach using a composition comprising the silicone-graft acrylic resin for application as an antifouling paint. Japanese Laid-Open Patent Application Nos. 151272/1986 and 59672/1987 disclose a high-weatherability paint and a parting agent, both of which contain, as a principal resin component, a silicone-graft acrylic resin composed of polydimethylsiloxane macromonomer, a cross-linking monomer, and a radical-polymerizing monomer.

However, the cross-linking reactivity of the silicone-graft acrylic resin therein is insufficient, since the silicone segments of the branch chains of the silicone-graft acrylic resin have no functional groups. Moreover, according to the Eighth Toryo-Toso Gizyutsu Sogokenkyu Happyokai Preprints, 8, 9 ( 1990), a micro-separated phase in a coating formed from the foregoing compositions was observed between the silicone and acrylic resin portions, such that the characteristics imparted by the silicone component are not therefore exhibited uniformly throughout the coating. Furthermore, due to segmental localization of the silicone, recoating characteristics of the coating composition are not satisfactory, although parting characteristics are improved.

Furthermore, a graft polymer obtained by the copolymerization of a silicone macromonomer, including two or more free functional groups from the alkoxysilyl or silanol groups, with a vinyl monomer is also known as a silicone-modified acrylic resin. Japanese Laid-Open Patent Application No. 275132/1987, for example, discloses that characteristics of weatherability, water repellency, and cross-linking reactivity of this type of graft polymer are satisfactory, and that it is compatible with other resins.

In application of this of silicone-modified acrylic resin, the Si—O—C bonds created in the reaction of the acrylic resin with the hydroxyl group of the curing agent tend to be hydrolyzed; consequently the characteristics imparted by the silicone gradually deteriorate. This is because the reaction of the alkoxysilyl groups and the silanol groups proceeds only wherein there is, in the presence of water, a self-condensation reaction, and a dealcoholate reaction or a dehydrate reaction with a hydroxyl group.

SUMMARY OF THE INVENTION

An object of the present invention is to provide a curing type resin composition which overcomes the foregoing prior art drawbacks.

Another object is to improve the cross-linking reactivity of a curing type resin composition containing a silicone-modified resin, which is thus capable of yielding a cured resin wherein there is scarcely any deterioration of the characteristics imparted by its silicone component.

Still another object of the present invention is to provide a coating wherein there is scarcely any deterioration of the characteristics imparted by its silicone component.

Still another object is to provide a method of forming a coating material, wherein there is scarcely any deterioration of the characteristics imparted by its silicone component.

A curing type resin composition according to one aspect of the present invention includes a copolymer resin and a curing agent. The copolymer resin is composed of a silicone compound and an $\alpha, \beta$-unsaturated vinyl monomer. The silicone compound is selected from the group consisting of silicone compounds having the following general structural formulas ( 1) or ( 2). The curing agent has at least two functional groups, individual molecules of which react with a functional group in the groups Y of the silicone compounds.

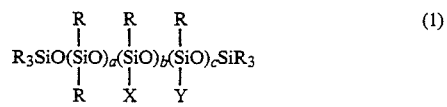

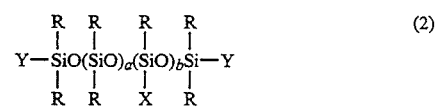

wherein:
X is selected from the group consisting of a 3-acryloxypropyl group and a 3-methacryloxypropyl group;
Y is selected from the group consisting of a 3-glycidoxypropyl group; a 2-(3',4'-epoxycyclohexyl)ethyl group; a 3-hydroxypropyl group; a 3-(2'-hydroxyethoxy)propyl group; and a 3-(4'-(3',3'-dihydroxymethyl)butoxy)propyl group,
R is selected from the group consisting of a phenyl group and an alkyl group having 1 to 6 carbon atoms; and
a, b, and c are numbers in the following ranges:

$1 \leq a \leq 20$ $0.5 \leq b \leq 2$ $1 \leq c \leq 10$

According to another aspect of the invention, a resin as a coating comprises a curing type resin composition which contains a copolymer resin and a curing agent. The copolymer resin is composed of a silicone compound and an $\alpha, \beta$-unsaturated vinyl monomer. The silicone compound is selected from the group consisting of silicone compounds having the following general structural formulas (1) or (2). The curing agent has at least two functional groups, individual molecules of which react with a functional group in the groups Y of the silicone compounds.

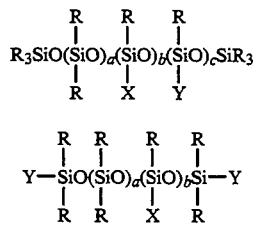

wherein:
X is selected from the group consisting of a 3-acryloxypropyl group and a 3-methacryloxypropyl group;
Y is selected from the group consisting of a 3-glycidoxypropyl group; a 2-(3',4'-epoxycyclohexyl)ethyl group; a 3-hydroxypropyl group; a 3-(2'-hydroxyethoxy)propyl group; and a 3-(4'-(3', 3'-dihydroxymethyl)butoxy)propyl group,
R is selected from the group consisting of a phenyl group and an alkyl group having 1 to 6 carbon atoms; and
a, b, and c are numbers in the following ranges:

$1 \leq a \leq 20$ $0.5 \leq b \leq 2$ $1 \leq c \leq 10$

A method of forming a coating material according to another aspect of the invention includes the steps of: preparing a curing type resin composition, diluting the curing type resin composition with solvent, and applying the diluted thermosetting resin composition to a suitable substrate. The curing type resin composition contains a copolymer resin and a curing agent. The copolymer resin is composed of a silicone compound and an α, β-unsaturated vinyl monomer. The silicone compound is selected from the group consisting of silicone compounds having the following general structural formulas (1) or (2); and the curing agent has at least two functional groups, individual molecules of which react with a functional group in the groups Y of the silicone compounds.

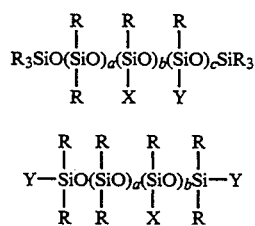

wherein:
X is selected from the group consisting of a 3-acryloxypropyl group and a 3-methacryloxypropyl group;
Y is selected from the group consisting of a 3-glycidoxypropyl group; a 2-(3',4'-epoxycyclohexyl)ethyl group; a 3-hydroxypropyl group; a 3-(2'-hydroxyethoxy)propyl group; and a 3-(4'-(3',3'-dihydroxymethyl)butoxy)propyl group,
R is selected from the group consisting of a phenyl group and an alkyl group having 1 to 6 carbon atoms; and
a, b, and c are numbers in the following ranges:

$1 \leq a \leq 20$ $0.5 \leq b \leq 2$ $1 \leq c \leq 10$

The foregoing and other objects and advantages of the present invention will be more fully apparent from the following detailed description.

DESCRIPTION OF THE INVENTION

Silicone Compound

The silicone compound employed in this invention has the following general structural formula, (1) or (2). The silicone compound may be used singly or in combination.

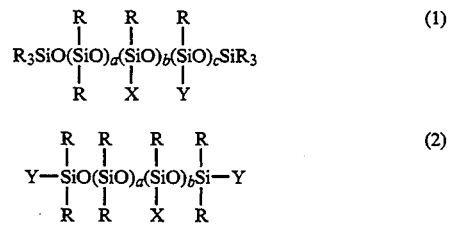

The group X in the structural formulas stands for a 3-acryloxypropyl group or a 3-methacryloxypropyl group. The unsaturated linkage part of the group X attributes the silicone compound to copolymerizing with the α, β-unsaturated vinyl monomer, to be described later.

The group Y in the structural formulas stands for the group selected from the group consisting of 3-glycidoxypropyl group, 2-(3',4'-epoxycyclohexyl)ethyl group, 3-hydroxypropyl group, 3-(2'-hydroxyethoxy)propyl group and 3-(4'-(3',3'-dihydroxymethyl) butoxy)propyl group. The group Y can form a cross-linking structure of the copolymer resin employed in the this invention by reacting at its hydroxyl group or epoxy group with the curing agent, to be described later.

The silicone compound may contain two or more kinds of groups for both the group X and the group Y.

The group R in the structural formulas stands for a phenyl group or an alkyl group having 1 to 6 carbon atoms. From the industrial point of view, a favorable choice for the group R is a methyl group or a phenyl group.

The silicone compound may contain two or more kinds of R groups. For example, the silicone compound, which has a dimethylsiloxane unit as a principal unit, and also has a diphenylsiloxane unit and/or a methylphenylsiloxane unit as a co-unit, enhances reactivity and compatibility with the α, β-unsaturated vinyl monomer.

In the structural formulas, a, b, and c stand for numbers which are in the following ranges:
$1 \leq a \leq 20$; more preferably, $3 \leq a \leq 10$;
$0.5 \leq b \leq 2$; more preferably, $0.7 \leq b \leq 1.3$; and
$1 \leq c \leq 10$; more preferably, $2 \leq c \leq 5$.

If a is less than one, flexibility and water repellency qualities imparted by the silicone compound are scarcely apparent. On the other hand, If a is over 20, the reactivity and the compatibility of the silicone compound with an α, β-unsaturated vinyl monomer are reduced. If b is less than 0.5, the reactivity of the silicone compound with the α, β-unsaturated vinyl monomer is reduced such that unreacted silicone compound tends to remain in the copolymer, deteriorating the characteristics of the copolymer resin. Conversely, if b is over 2, it is impracticable to obtain the copolymer resin, in consequence of the gelation which takes place during the solution polymerization of the silicone compound with the α, β-unsaturated vinyl monomer. If c is less than 1, the cross-linking reactivity of the silicone compound is insufficient. On the other hand, if c is over 10, the viscosity of the silicone compound increases such that the reactivity and the compatibility of the silicone compound with the α, β-unsaturated vinyl monomer are reduced.

The silicone compound having the aforementioned structural formulas may be a block copolymer or a random copolymer.

Specimens of the silicone compound employed in this invention are as follows. Me and Ph in the following structural formulas represent a methyl group and a phenyl group respectively.

① Specimens of the silicone compound having the structural formula (1)

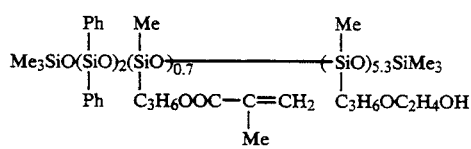

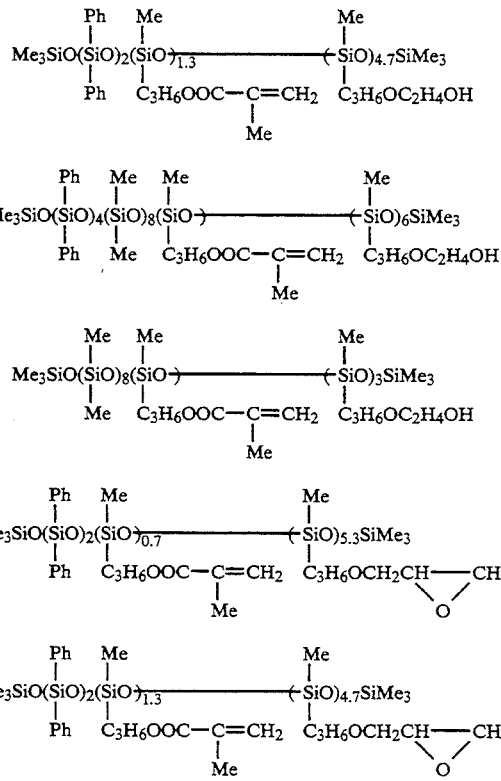

② Specimens of the silicone compound having the structural formula (2)

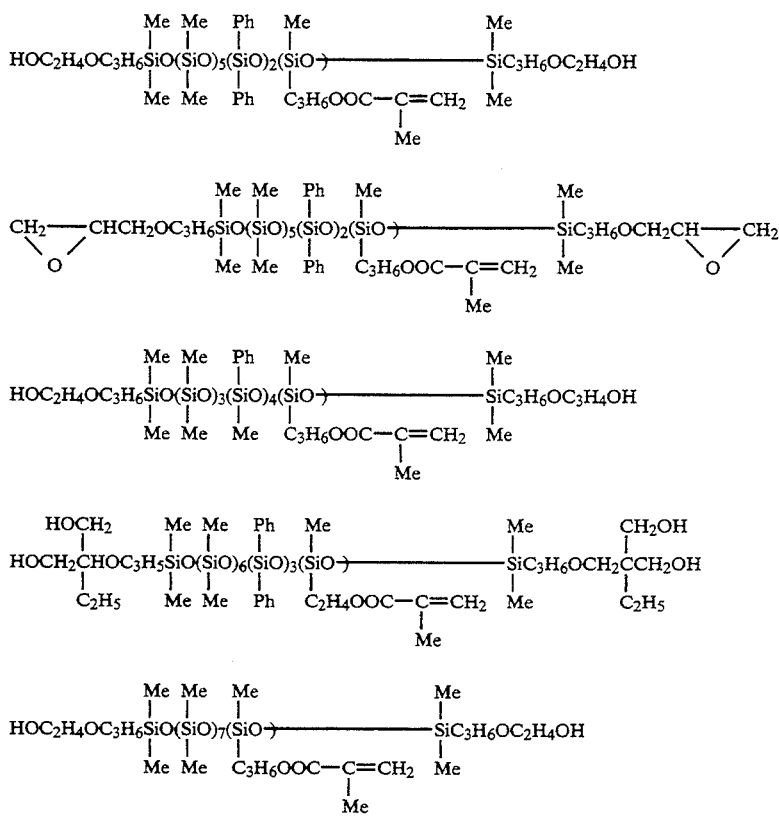

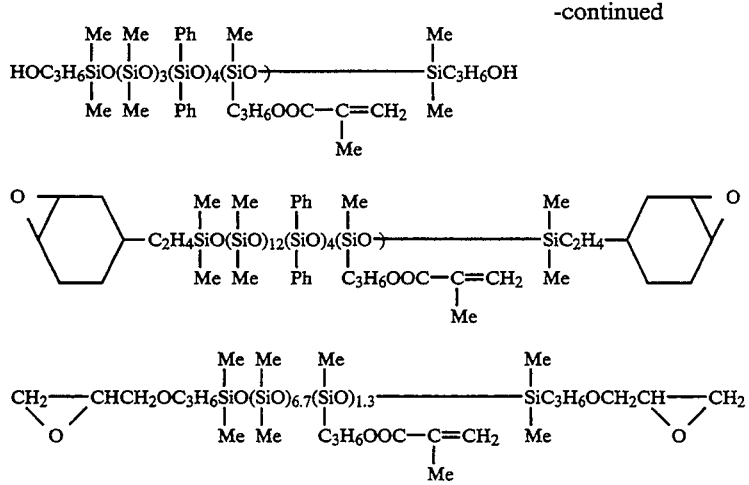

The silicone compound employed in this invention can be produced by the following methods, for example.

I. Silicone compound having the structural formula (1)

This type of silicone compound can be prepared by hydrosilyation of a phenylmethylhydrogen polysiloxane with an alkene having an organic functional group. The phenylmethylhydrogen polysiloxane employed in the foregoing hydro silyating method mentioned above can be synthesized, for example, through the following reaction.

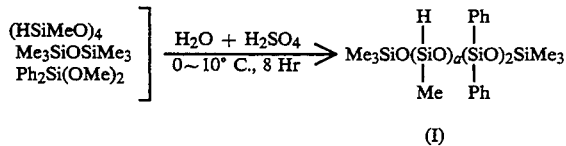

A desired silicone compound can be synthesized through the following reaction.

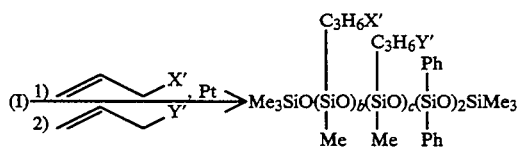

II. Silicone compound having the structural formula (2)

This type of silicone compound can be prepared by the equilibration of the reaction product, which is obtained by the reaction of tetramethyl disiloxane with 3-methacryloxypropylmethyldimethoxysilane and water under the existence of an acid catalyst, and an alkali-equilibrated octamethylcyclotetra siloxane and octaphyenylcyclotetra siloxane, by employing trifluoromethane sulfonic acid. The following is the synthesis path of the silicone compound in accordance with the foregoing reaction.

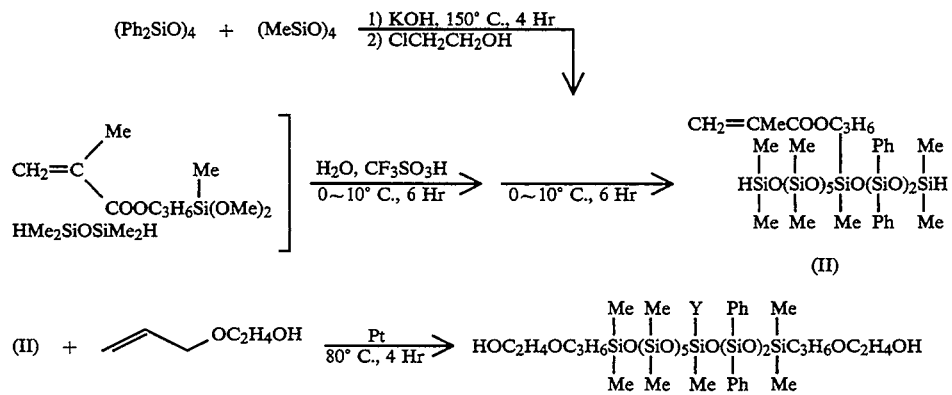

α, β-Unsaturated Vinyl Monomer

As the α, β-unsaturated vinyl monomer employed in this invention, examples include an acryl monomer, styrene, α-methyl styrene, α-methyl styrene dimer, itaconic acid, itaconic anhydride, maleic acid, maleic anhydride, vinyl acetate, allyl acetate, vinyltrimethoxysilane, vinyltriethoxysilane, vinylmethyldimethoxysilane, vinylmethyldiethoxysilane or the like.

More specifically, examples of the acryl monomer include methyl acrylate, methyl methacrylate, ethyl acrylate, ethyl methacrylate, n-butyl acrylate, n-butyl methacrylate, iso-butyl acrylate, iso-butyl methacrylate, tert-butyl acrylate, tert-butyl methacrylate, 2-ethylhexyl acrylate, 2-ethylhexyl methacrylate, lauryl acrylate, lauryl methacrylate, phenyl acrylate, phenyl methacrylate, benzyl acrylate, benzyl methacrylate, cyclohexyl acrylate, cyclohexyl methacrylate, cyclohexsenylmethyl acrylate, cyclohexsenylmethyl methacrylate, 2-hydroxyethyl acrylate, 2-hydroxyethyl methacrylate, 2-hydroxypropyl acrylate, 2-hydroxypropyl methacrylate, 4-hydroxybutyl acrylate, 4-hydroxybutyl methacrylate, adducts formed by treating ε-caprolacton with 2-hydroxyethyl acrylate or 2-hydroxyethyl methacrylate (a example of such an adduct is "PLACCEL FM-1", a product of Daicel Chemical Industries Kabushiki Kaisha), acrylic acid, methacrylic acid, 2-acrylamide-2-methylpropane sulfonic acid, acid phosphoxypropyl methacrylate, glycidyl acrylate, glycidyl methacrylate, 3,4-epoxycyclohexyl acrylate or 3,4-epoxycyclohexyl methacrylate (examples of which are "CYCLOMER M-100" and "CYCLOMER A-200", products of Daicel Chemical Industries Kabushiki Kaisha), 3-trimethoxysilylpropyl acrylate, 3-trimethoxysilylpropyl methacrylate, 3-triethoxysilylpropyl acrylate, 3-triethoxysilylpropyl methacrylate, 3-dimethoxymethylsilylpropyl acrylate, 3-dimethoxymethylsilylpropyl methacrylate, tributylstannane acrylate, tributylstannane methacrylate, acrylamide, methacrylamide, acryloyl isocyanate, methacryloyl isocyanate, 2-isocyanate acrylic acid, 2-isocyanate methacrylic acid or the like.

The α, β-unsaturated vinyl monomer may be used singly or in combination.

Copolymer Resin

The copolymer resin employed in this invention is a copolymer comprising units derived from the silicone compound and the α, β-unsaturated vinyl monomer. More specifically, the copolymer is a graft copolymer wherein the branches derived from the silicone compound are grafted to the chain derived from the α, β-unsaturated vinyl monomer.

This type of copolymer can be obtained by a general method of polymerization such as solution polymerization, suspension polymerization, bulk polymerization or emulsion polymerization. When the copolymer is synthesized by one of these polymerization methods, it is preferable to mix the silicone compound in proportion of 5 to 80 wt. % (more preferably 20 to 70 wt. %) with the α, β-unsaturated vinyl monomer in proportion of 95 to 20 wt. % (more preferably 80 to 30 wt. %). A copolymer in which the silicone compound is less than 5 wt. % and the α, β-unsaturated vinylmonomer is over 95 wt. %, will scarcely demonstrate the characteristics imparted by the silicone compound. Conversely, if the silicone compound is over 80 wt. % and the α, β-unsaturated vinyl monomer is less than 20 wt %, the mechanical strength of a coating made of the inventive composition is impaired.

In the copolymerizing reaction of the silicone compound with the α, β-unsaturated vinyl monomer, unsaturated linkage of the groups X of the silicone compound takes place in the polymerization reaction of the α, β-unsaturated vinyl monomer; therefore the branches derived from the silicone compound are grafted to the chain derived from the α, β-unsaturated vinyl monomer.

The copolymer may include units derived from monomers other than the silicone compound and the α, β-unsaturated vinyl monomer.

Curing Agent

The curing agent employed in this invention has at least two functional groups, individual molecules of which react with a functional group in the groups Y of the silicone compound. If the functional group in the groups Y is a hydroxyl group, examples of this type of curing agent may include a polylsocyanate compound, melamine-formaldehyde resin, an anhydride of a dibasic acid, an epoxy compound, a compound having an alkoxysilyl group, and a compound having a silanol group. On the other hand, if the functional group in the groups Y is an epoxy group, the curing agent can be, for example, a polybasic acid or a compound having a hydroxyl group.

Examples of the aforementioned polyisocyanate compound may include tolylene diisocyanate, xylylene diisocyanate, hexamethylene diisocyanate, isophoronc diisocyanate and methylenebis(4-cyclohexylisocyanate). The polyisocyanate compound may be used singly or in combination.

Examples of the melamine-formaldehyde resin may include methylated melamine resin and buthylated melamine resin. The degree of modification and the degree of self-condensation of the melamine-formaldehyole resin can be determined to suit application of the composition of the present invention.

Examples of the epoxy compound include bisphenol-A glycidyl ether and ancopolymer of the α, β-unsaturated vinyl monomer having an epoxy group, e.g., a copolymer composed of the epi-bis type epoxy resin, and glycidyl acrylate or glycidyl methacrylate.

The compound having an alkoxysilyl group may be, for example, a silicone compound having the following structural formula (3) or (4), γ-methacryloyloxy trimethoxysilane polymer, a polymer composed of an α, β-unsaturated vinyl monomer having an alkoxysilyl group, or a copolymer composed of the α, β-unsaturated vinyl monomer having an alkoxysilyl group and other monomers.

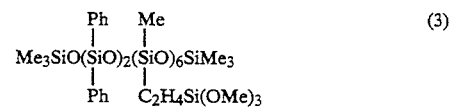

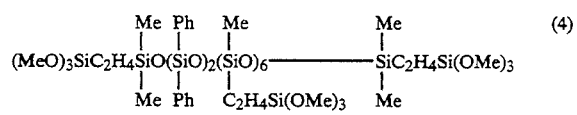

Examples of the compound having a silanol group may include the silicone compound having a silanol group at both its terminal ends (e.g., "SE9186RTV", a product of Dow Corning Toray, LTD.) and the like. The polybasic compound may be, for example, a long chain aliphatic polycarboxylic acid, an aromatic polycarboxylic acid, an anhydride of each of these polycarboxylic acids, a copolymer composed of acrylic acid and other monomers, a copolymer composed of methacrylic acid and other monomers, a copolymer composed of maleic anhydride and other monomers, a copolymer composed of itaconic anhydride and other monomers, or the like.

The curing agent can be used singly or in combination.

The mixing ratio of the copolymer and the curing agent is preferably established within the following range; the scope of the present invention, however, is not limited by the mixing ratio.

$$\frac{C_1}{C_2} = 0.5 - 2.0$$

wherein:
$C_1$ represents the concentration of the group Y of the copolymer; and $C_2$ represents the concentration of the functional group, reactional with the group Y, of the curing agent.

Other Components

The curing type resin composition according to the present invention can contain other components in addition to the aforementioned copolymer and curing agent. Such components may be, for example, a crosslink-curing accelerator, a solvent, pigments and various other additives.

If the group Y of the silicone compound includes a hydroxyl group and the curing agent is a melamine-formaldehyde resin, an acid compound such as p-toluene sulfonic acid or dodecylbenzenesulfonic acid can be used as the crosslink-curing accelerator. If the group Y includes a hydroxyl group and the curing agent is a polyisocyanate compound, an organic stannate compound such as dibutyltin dilaurate, dibutyltin maleate and dioctyltin dilaurate; the aforementioned acid compounds; or an amine compound, such as ethylenediamine or triethylenetetramine, can be used as a crosslink-curing accelerator. If the group Y includes a hydroxyl group and the curing agent is a compound including a alkoxysilyl group and/or a silanol group, the aforementioned organic stannate compounds; phosphoric acid; acid phosphoric acid ester such as monomethyl phosphate or monobutyl phosphate; an organic titanate compound; an amine compound such as hexylamine or N,N-dimethyldodecylamine can be used as the crosslink-curing accelerator. If the group Y includes an epoxy group and the curing agent is a polybasic acid compound, an amine compound such as tetrabutylammonium bromide, tetrabutylammonium chloride or dimethylbenzylamine, can be used as the crosslink-curing accelerator.

These types of crosslink-curing accelerators can be added to the resin composition in the range of 0.01 to 3 wt. % based on the weight of the solid portion of the composition.

Use of the Curing Type Resin Composition

The curing type resin composition of the present invention can be used as a molding material, a material for medical use, or as a coating material for applications in painting, or in electronic, biomedical and other such fields.

When the resin composition is used as a paint binder, the composition is dissolved in an organic solvent or a water-based solvent. Examples of the organic solvent include xylene, toluene, methylisobutylketone, aromatic petroleum naphtha having a moderate boiling point (e.g., "TOKU SOLVENT", a product of Showa Chemical Kabushiki Kaisha), and turpenentine.

Normally, the resin composition thermosets when it is cured at a temperature ranging from room temperature to about 220° C. for from 3 to 60 minutes.

DESCRIPTION OF THE PREFERRED EMBODIMENTS

Preparation of silicone-graft acrylic resin (A)

A reactor equipped with an agitator, a reflex condenser, a thermometer, dropping funnels, and a nitrogen inlet, was prepared. Xylene of 50 parts, "SORVESSO 100" (a product of Esso Standard Petroleum, LTD.) of 35 parts, and butanol of 10 parts were introduced into the flask, and the mixture of these solvents was then maintained at 130° C. Next, a mixture comprising 50 parts of silicone compound having the following structural formula (5), a styrene of 20 parts, methyl methacrylate of 27 parts, methacrylic acid of 3 parts, and tert-butylperoxy-2-ethylhexanoate of 3 parts was delivered dropwise at a constant rate for 3 hours from the dropping funnel into the reactor.

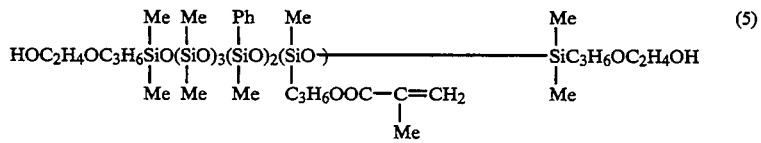

The contents of the reactor were then maintained at 130° C., and 30 minutes from the completion of delivery of the foregoing mixture, another mixture comprising xylene of 5 parts and tert-butylperoxy-2-ethylhexanoate of 0.5 parts was delivered from the dropping funnel into the reactor dropwise at a constant rate for 30 minutes. Subsequently, the contents were maintained at 130° C. for 2 hours and were then cooled, whereby a clear resinous solution of the silicone-graft acrylic resin (A) was obtained.

The number average molecular weight and the weight average molecular weight of the silicone-graft acrylic resin (A), each of them was based on the reduced molecular weight of styrene measured by Gel Permeation Chromatography (G.P.C.), were 4,800 and 191,000 respectively. The concentration of non-volatile ingredients of the resinous solution was 49.2 wt. %, and the Gardner viscosity of the silicone-graft acrylic resin (A) was of degree H.

Preparation of Silicone-Graft Acrylic Resin (B)

Xylene of 24 parts, SORVESSO 100 of 35 parts, butanol of 8 parts, and 20 parts of a silicone compound having the following structural formula (6) were introduced into the same reactor used the preparation of the silicone-graft acrylic resin (A), and were maintained at 120° C.

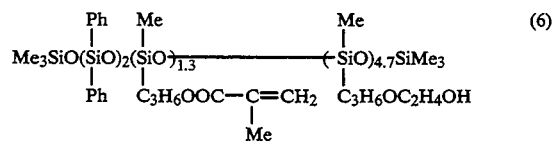

Next, a mixture comprising styrene of 30 parts, 2-ethylhexylmethacrylate of 46 parts, 2-ethylhexylacrylate of 6 parts, methacrylic acid of 3 parts and azobisisobutyromitrile of 2 parts was delivered from the dropping funnel into the reactor dropwise at a constant rate for 3 hours. The contents of the reactor were then maintained at 120° C., and 30 minutes from the completion of the delivery of the foregoing mixture, another mixture comprising xylene of 2 parts and tert-butyl-peroxy-2-ethylhexyanoate of 0.5 parts was delivered from the dropping funnel into the reactor dropwise at a constant rate for 30 minutes. Subsequently, the contents were maintained at 120° C. for 2 hours and were then cooled, whereby a clear resinous solution of silicone-graft acrylic resin (B) was obtained.

The number average molecular weight and the weight average molecular weight of the silicone-graft acrylic resin (B), measured by the same method employed in the preparation of the silicone-graft acrylic resin (A), were 7,300 and 160,000 respectively. The concentration of non-volatile ingredients in the resinous solution was 63.8 wt. %, and the Gardner viscosity of the silicone-graft acrylic resin (B) was of degree Z6.

Preparation of Silicone-Graft Acrylic Resin (C)

A resinous solution of the silicone-graft acrylic resin (C) was prepared according to the same method employed in the preparation of the silicone-graft acrylic resin (A), except that a silicone compound having the following structural formula (7) was used in place of the silicone compound employed in the preparation of the silicone-graft acrylic resin (A).

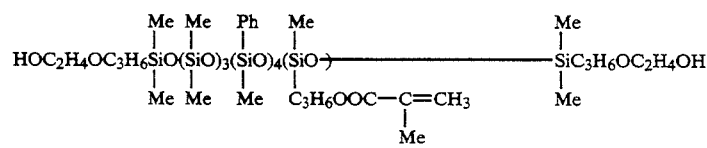

The number average molecular weight and the weight average molecular weight of the silicone-graft acrylic resin (C), measured by the same method employed in the preparation of the silicone-graft acrylic resin (A), were 2,800 and 11,900 respectively. The concentration of non-volatile ingredients in the resinous solution was 47.5 wt. %, and the Gardner viscosity of the silicone-graft acrylic resin (C) was of degree J.

Preparation of silicone-graft acrylic resin (D)

A resinous solution of the silicone-graft acrylic resin (D) was prepared by the same method employed in the preparation of the silicone-graft acrylic resin (A), except that a silicone compound having the following structural formula (8) was used in place of the silicone compound employed in the preparation of the silicone-graft acrylic resin (A).

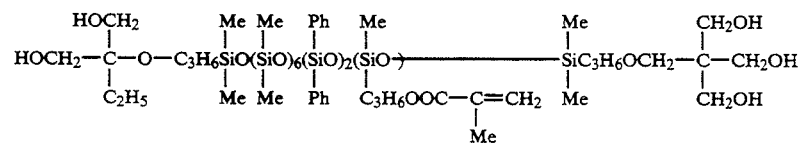

The number average molecular weight and the weight average molecular weight of silicone-graft acrylic resin (D), measured by the same method employed in the preparation of the silicone-graft acrylic resin (A), were 3,800 and 20,100 respectively. The concentration of non-volatile ingredients in the resinous solution was 47.3 wt. %, and the Gardner viscosity of the silicone-graft acrylic resin (D) was of degree L.

Preparation of silicone-graft acrylic resin (E)

Xylene of 50 parts, SORVESSO 100 of 35 parts and butanol of 10 parts were introduced into the same reactor used in the preparation of the silicone-graft acrylic resin (A), and were maintained at 130° C. A mixture comprising 70 parts of the silicone compound having the following structural formula (9), styrene of 15 parts, methyl methacrylate of 12 parts, methacrylic acid of 3 parts, and tert-butylperoxy-2-ethylehxanoate of 3 parts, was delivered from the dropping funnel into the reactor dropwise at a constant rate for 3 hours.

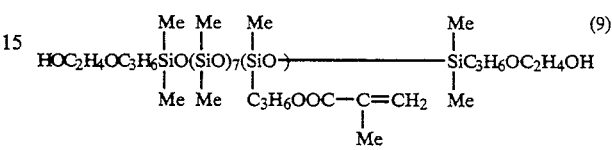

The contents of the reactor were then maintained at 130° C., and 30 minutes from the completion of delivery of the foregoing mixture, another mixture comprising xylene of 5 parts and tert-butylperoxy-2-ethylhexanoate of 0.5 parts was delivered from the dropping funnel into the reactor dropwise at a constant rate for 30 minutes. Subsequently, the contents were maintained at 130° C. for 2 hours and were then cooled, whereby a clear resinous solution of the silicone-graft acrylic resin (E) was obtained.

The number average molecular weight and the weight average molecular weight of the silicone-graft acrylic resin (E), measured by the same method employed in the preparation of the silicone-graft acrylic resin (A), were 4,200 and 39,000 respectively. The concentration of non-volatile ingredients in the resinous solution was 48.3 wt. %, and the Gardner viscosity of the silicone-graft acrylic resin (E) was of degree G.

Preparation of silicone-graft acrylic resin (F)

Xylene of 50 parts and SORVESSO 100 of 45 parts were introduced into the same reactor used in the preparation of the silicone graft acrylic resin (A), and were maintained at 130° C. A mixture comprising 50 parts of the silicone compound having the following structural formula (10), styrene of 20 parts, methyl methacrylate of 20 parts, 2-hydroxylethylmethacrylate of 10 parts, and tert-butylperoxy-2-methylhexanoate of 3 parts, was delivered from the dropping funnel into the reactor dropwise at a constant rate for 3 hours.

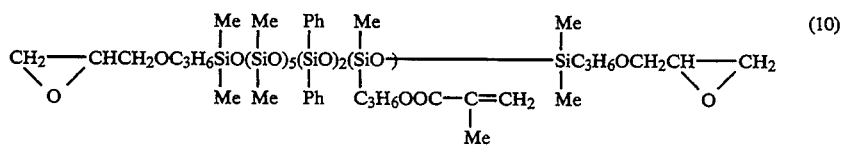

The contents of the reactor were then maintained at 130° C., and 30 minutes from completion of delivery of the foregoing mixture, a mixture comprising xylene of 5 parts and tert-butylperoxy-2-ethylhexanoate of 0.5 parts was delivered from the dropping funnel into the reactor dropwise at a constant rate for 30 minutes. Subsequently, the contents were maintained at 130° C. for 2 hours and were then cooled, whereby a clear resinous solution of the silicone-graft acrylic resin (F) was obtained.

The number average molecular weight and the weight average molecular weight of the silicone-graft acrylic resin (F), measured by the same method employed in the preparation of the silicone-graft acrylic resin (A), were 4,100 and 46,100 respectively. The concentration of non-volatile ingredients in the resinous solution was 49.2 wt. %, and the Gardner viscosity of the silicone-graft acrylic resin (F) was of degree G.

Preparation of silicone-graft acrylic resin (G)

Xylene of 50 parts and butylacetate of 45 parts were introduced into the same reactor used in the preparation of the silicone-graft acrylic resin (A), and were maintained at 130° C. A mixture comprising 50 parts of the same silicone compound employed in the preparation of the silicone-graft acrylic resin (F), glycidyl methacrylate of 21.2 parts, 2-hydroxylethyl methacrylate of 22 parts, methyl methacrylate of 6.8 parts, and tert-butylperoxy-2-ethylhexanoate of 3 parts, was delivered from the dropping funnel into the reactor dropwise at a constant rate for 3 hours.

The contents of the reactor were then maintained at 130° C., and 30 minutes from completion of delivery of the foregoing mixture, another mixture comprising xylene of 5 parts and tert-butylperoxy-2-ethylhexanoate of 0.5 parts was delivered from the dropping funnel into the reactor dropwise at a constant rate for 30 minutes. Subsequently, the contents were maintained at 130° C. for 2 hours and were then cooled, whereby a clear resinous solution of the silicone-graft acrylic resin (G) was obtained.

The number average molecular weight and the weight average molecular weight of the silicone-graft acrylic resin (G), measured by the same method employed in the preparation of the silicone-graft acrylic resin (A), were 3,400 and 40,600 respectively. The concentration of non-volatile ingredients of the resinous solution was 47.1 wt. %, and the Gardner viscosity of the silicone-graft acrylic resin (G) was of degree H.

Preparation of silicone-graft acrylic resin (H)

TOKU SOLVENT of 69 parts was introduced into the same reactor employed in the preparation of the silicone-graft acrylic resin (A), and was maintained at 110° C. A mixture comprising 20 parts of the same silicone compound used in the preparation of the silicone-graft acrylic resin (E), 2-hydroxylethyl methacrylate of 6.6 parts, 2-ethylhexyl methacrylate of 28.4 parts, tert-butyl methacrylate of 44 parts, 1 part methacrylic acid, and tert-butylperoxy-2-ethylhexanoate of 1.2 parts, was delivered from the dropping funnel into the reactor dropwise at a constant rate for 3 hours.

The contents of the reactor were then maintained at 110° C., and 30 minutes from completion of delivery of the foregoing mixture, another mixture comprising TOKU SOLVENT of 10.4 parts and tert-butylperoxy-2-ethylhexanoate of 0.2 parts was delivered from the dropping funnel into the reactor dropwise at a constant rate for 30 minutes. Subsequently, the contents were maintained at 110° C. for 2 hours and were then cooled, whereby a clear resinous solution of the silicone-graft acrylic resin (H) was obtained.

The number average molecular weight and the weight average molecular weight of the silicone-graft acrylic resin (H), measured by the same method employed in the preparation of the silicone-graft acrylic resin (A), were 8,000 and 60,500 respectively. The concentration of non-volatile ingredients in the resinous solution was 53.1 wt. %, and the Gardner viscosity of the silicone-graft acrylic resin (11) was of degree Z1.

Preparation of silicone-graft acrylic resin (I)

Ethoxypropanol of 50 parts was introduced into the same reactor used in the preparation of the silicone-graft acrylic resin (A), and was maintained at 105° C. A mixture comprising 50 parts of the same silicone compound employed in the preparation of the silicone-graft acrylic resin (E), methacrylic acid of 5 parts, 2-ethylhexyl methacrylate of 16 parts, methyl methacrylate of 20.5 parts, styrene of 8.5 parts, ethoxypropanol of 50 parts, and tert-butylperoxy-2-ethylhexanoate of 2.5 parts, was delivered from the dropping funnel into the reactor dropwise at a constant rate for 3 hours.

The contents of the reactor were then maintained at 105° C., and 30 minutes from completion of delivery of the foregoing mixture, another mixture comprising ethoxypropanol of 2.5 parts and tert-butylperoxy-2-ethylhexanoate of 0.3 parts was delivered from the dropping funnel into the reactor dropwise at a constant rate for 30 minutes. Subsequently, the contents were maintained at 105° C. for 3 hours and were then cooled. Furthermore, diethyleneglycol monobutylether of 25 parts was added into the reactor, and the solvent in the reactor was then distilled at 100° C. under a reduced pressure of 10 mm Hg. Next, diethylethanolamine of 4.8 parts and distilled water of 375 parts were added into the reactor, whereby a resinous solution of the silicone-graft acrylic resin (I) was obtained.

The number average molecular weight and the weight average molecular weight of silicone-graft acrylic resin (I), measured by the same method employed in the preparation of the silicone-graft acrylic resin (A), were 3,800 and 38,000 respectively. The concentration of non-volatile ingredients in the resinous solution was 20.1 wt. %, and the viscosity of the silicone-graft acrylic resin (I) was 80 cp.

Preparation of Silicone-Graft Acrylic Resin (J)

A resinous solution of the silicone-graft acrylic resin (J) was prepared by the same method employed in the preparation of the silicone-graft acrylic resin (A), except that 33.8 parts of dimethylsiloxane macromonomer ("SYLAPLANE FM-0711", a product of Chisso Kabushiki Kaisha), the molecular weight of which is approximately 1,000, and 2-hydroxyethyl methacrylate of 16.2 parts were used in place of the silicone compound used in the preparation of the silicone-graft acrylic resin (A).

The number average molecular weight and the weight average molecular weight of the silicone-graft acrylic resin (J), measured by the same method employed in the preparation of the silicone-graft acrylic resin (A), were 6,000 and 12,000, respectively. The concentration of non-volatile ingredients in the resinous solution was 49.9 wt. %, and the Gardner viscosity of the silicone-graft acrylic resin (J) was of degree I.

Preparation of Acrylic Resin (A)

The slight milky resinous solution of acrylic resin (A) was prepared by the same method employed in the preparation of the silicone-graft acrylic resin (A) except that "PLACCEL FM-1" (a product of Daicel Chemical Industries Kabushiki Kaisha) was used in place of the silicone compound used in the preparation of the silicone-graft acrylic resin (A).

The number average molecular weight and the weight average molecular weight of the acrylic resin (A), measured by the same method employed in the preparation of the silicone-graft acrylic resin (A), were 6,100 and 14,200 respectively. The concentration of non-volatile ingredients in the resinous solution was 49.5 wt. %, and the Gardner viscosity of the acrylic resin (A) was of degree J.

Preparation of the Copolymer of Maleic Anhydride (A)

Xylene of 40 parts and butyl acetate of 40 parts were introduced into the same reactor used in the preparation of silicone-graft acrylic resin (A), and were maintained at 130° C. A mixture comprising maleic anhydride of 30 parts, styrene of 30 parts, 2-ethylhexyl methacrylate of 40 parts, butyl acetate of 10 parts, and tert-butylperoxy-2-ethylhexanoate of 3 parts, was delivered from the dropping funnel into the reactor dropwise at a constant rate for 3 hours.

The contents of the reactor were then maintained at 130° C., and 30 minutes from completion of delivery of the foregoing mixture, another mixture comprising butyl acetate of 10 parts and tert-butylperoxy-2-ethylhexanoate of 0.5 parts was delivered from the dropping funnel into the reactor dropwise at the constant rate for 30 minutes. Subsequently, the contents were maintained at 130° C. for 2 hours and were then cooled, whereby a clear resinous solution of the copolymer of maleic anhydride (A) was obtained.

The number average molecular weight and the weight average molecular weight of the copolymer (A), measured by the same method employed in the preparation of the silicone-graft acrylic resin (A), were 4,300 and 8,100 respectively. The concentration of non-volatile ingredients in the resinous solution was 45.1 wt. %, and the Gardner viscosity of the copolymer (A) was of degree U.

Embodiments 1 to 9, Comparative Examples 1 to 3

The curing type resin compositions indicated in Table 1 were prepared.

TABLE 1

| | Embodiment | | | | | | | | | Comparative examples | | |
|---|---|---|---|---|---|---|---|---|---|---|---|---|
| | 1 | 2 | 3 | 4 | 5 | 6 | 7 | 8 | 9 | 1 | 2 | 3 |
| Silicone-graft acrylic resin | | | | | | | | | | | | |
| A | 140 | — | — | — | — | — | — | — | — | — | — | — |
| B | — | 117 | — | — | — | — | — | — | — | — | — | — |
| C | — | — | 140 | — | — | — | — | — | — | — | — | — |
| D | — | — | — | 140 | — | — | — | — | — | — | — | — |
| E | — | — | — | — | 140 | — | — | — | — | — | — | — |
| F | — | — | — | — | — | 150 | — | — | — | — | — | — |
| G | — | — | — | — | — | — | 120 | — | — | — | — | — |
| H | — | — | — | — | — | — | — | 155 | — | — | — | — |
| I | — | — | — | — | — | — | — | — | 233 | — | — | — |
| J | — | — | — | — | — | — | — | — | — | 150 | — | — |
| Acrylic resin (A) | — | — | — | — | — | — | — | — | — | — | 150 | 112 |
| X-22-160AS[1] | — | — | — | — | — | — | — | — | — | — | — | 14 |
| U-VAN 20N-60[2] | 50 | 50 | 50 | 50 | 50 | — | — | — | — | 50 | 50 | 50 |
| Takenate D-175-HN[3] | — | — | — | — | — | — | — | 15 | — | — | — | — |
| Cymel-303[4] | — | — | — | — | — | — | — | — | 30 | — | — | — |
| Copolymer of maleic anhydride (A) | — | — | — | — | — | 56 | 98 | — | — | — | — | — |
| p-Toluene sulfonic acid | — | — | — | — | — | — | — | — | — | — | — | — |
| Tetrabutylammonium bromide | — | — | — | — | — | 1.0 | 0.4 | — | 2.0 | — | — | — |
| Dibutyltin dilaurate | — | — | — | — | — | — | — | 0.17 | — | — | — | — |

(Unit: part)
[1]Dimethylsilicone having hydroxyl groups at both its terminal ends (MF = 900); product of Shinetsu Chemical Industries Kabushiki Kaisha.
[2]Melamine resin; product of Mitsui Toatsu Chemical Industries Kabushiki Kaisha.
[3]Hexamethylenediisocyanate; product of Takeda Chemical Industries Kabushiki Kaisha.
[4]Water-soluble methylated malamine resin; product of Mitsui Toatsu Chemical Industries Kabushiki Kaisha.

Cured coatings made of each curing type resin composition were formed, and the following tests were carried out respectively upon each cured coating. All of the cured coatings, except that of the embodiment 8, were formed by baking the curing type resin compositions. Baking was performed at 140° C. for 30 minutes in the preparation of the cured coatings. On the other hand, the cured coating of embodiment 8 was formed by drying the curing type resin composition. The drying was carried out at 25° C. and 75% humidity for one week. Table 2 shows the test results.

TABLE 2

|  | Appearance of the coating | Tg (°C.) | Weatherability (%) | Acid proof | Shock resistance | Recoating ability (%) |
|---|---|---|---|---|---|---|
| Embodiment |  |  |  |  |  |  |
| 1 | Clear | 83 | 95 |  | No change | 100 |
| 2 | Clear | 107 | 92 |  | No change | 100 |
| 3 | Clear | 84 | 96 |  | No change | 100 |
| 4 | Clear | 101 | 91 |  | No change | 100 |
| 5 | Clear | 81 | 98 |  | No change | 95 |
| 6 | Clear | 73 | 90 |  | No change | 100 |
| 7 | Clear | 117 | 92 |  | No change | 100 |
| 8 | Clear | 32 | 85 |  | No change | 95 |
| 9 | Clear | 91 | 90 |  | No change | 100 |
| Comparative examples |  |  |  |  |  |  |
| 1 | Clear | 147 | 82 |  | Crack was observed | 100 |
| 2 | Clear | 93 | 75 | X | No change | 100 |
| 3 | Milky | 95 | 53 | Δ | No change | 100 |

(1) Measurement of the Glass Transition Points (Tg) of the Cured Coatings

The dynamic-glass transition point of each cured coating, obtained by the dynamic-viscoelasticity test carried out at a frequency of 11Hz and a temperature-programmed rate of 2° C./min, using a "REO-VIBRON II" (a product of Toyo Bolding Kabushiki Kaisha), was measured from the maximum value of the temperature distribution of tans δ.

(2) Acid Proof

Two-tenths cc of 0.1N sulfuric acid solution was applied to each of the cured coatings. The solution was left as it was for one day under conditions of 20° C. temperature and 75% humidity, and was then dried for ten minutes at 60° C. Subsequently, the cured coatings, were rinsed with water and were then dried, and their condition was observed visually. Time criteria of evaluation were as follows.

⊙: Excellent
○: Acceptable
Δ: Slightly contaminated
X: Turned milky (3) Weatherability "TAIPAKE R-820" ( a titanium oxide produced by Ishihara Sangyo Kabushiki Kaisha) of 40 parts was added to each resin composition, based on 100 parts the solid portion thereof, and was then dispersed by a ball mill, whereby white paints were obtained. Each white paint was cured under the same conditions described above, and then the specular gloss of each white coating at 60° was observed.

Furthermore, 2000 hours of a Q.U.V. test was carried out, one cycle of which comprises 4 hours irradiation under a fluorescent ultra-violet lamp at 60° C. and no irradiation for 4 hours at 50° C. and 100% relative humidity following irradiation. Subsequently, each coating was observed again at 60° , to examine the retention of the specular gloss of each coating.

(4) Shock Resistance

A weight of 300 g was dropped from 50 cm above onto each cured coating according to Japanese Industrial Standard K5400, 6–13; and then the appearance of the cured coating was observed visually.

(5) Recoating Ability

An over-coating of the same composition was formed on each cured coating, and 2 mm square cross-cuts were formed by knife in the second coat. Cellophane adhesive tape was stuck onto the cross-cuts and peeled away, thereupon the remaining extent of the cross-cuts was examined.

Various details of the invention may be changed without departing from its spirit or its scope. Furthermore, the foregoing description of the embodiments according to the present invention is provided for the purpose of the illustration only, and not for the purpose of limiting the invention as defined by the appended claims and their equivalents.

What is claimed is:

1. A curing type resin composition comprising:

a copolymer including a silicone compound and an α, β-unsaturated vinyl monomer, wherein said silicone compound is selected from the group consisting of: silicone compounds of structural formula (1) and silicone compounds of structural formula (2), as follows:

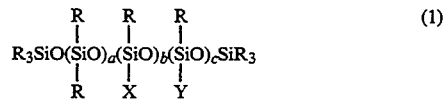

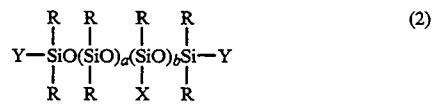

wherein:

X is selected from the group consisting of a 3-acryloxypropyl group and a 3-methacryloxypropyl group;

Y is selected from the group consisting of a 3-glycidoxypropyl group; a 2-(3',4'-epoxycyclohexyl)ethyl group; a 3-hydroxypropyl group; a 3-(2'-hydroxyethoxy)propyl group; and a 3-(4'-(3',3'-dihydroxymethyl)butoxy)propyl group, R is selected from the group consisting of a phenyl group and an alkyl group having 1 to 6 carbon atoms; and a, b, and c are numbers in the following ranges:

$1 \leq a \leq 20$ $0.5 \leq b \leq 2$ $1 \leq c \leq 10$, and a curing agent, wherein individual molecules of the curing agent include at least two functional groups which are capable of reacting with a functional group in the Y group of said silicone compound.

2. A composition according to claim 1, wherein said copolymer includes said silicone compound in an amount of 5 to 80 wt. % and said α, β-unsaturated vinyl monomer in an amount of 95 to 20 wt. %.

3. A composition according to claim 2, wherein said copolymer and said curing agent are present in a mixing ratio in the range as follows:

$$\frac{C_1}{C_2} = 0.5 - 2.0$$

wherein:
$C_1$ represents the concentration of the group Y of the copolymer; and
$C_2$ represents the concentration of the functional group of the curing agent which may react with the Y group of said silicone compound.

4. A composition according to claim 3, wherein said α, β-unsaturated vinyl monomer is selected from the group consisting of an acryl monomer, styrene, α-methyl styrene, α-methyl styrene dimer, itaconic acid, itaconic anhydride, maleic acid, maleic anhydride, vinyl acetate, allyl acetate, vinyltrimethoxysilane, vinyltriethoxysilane, vinylmethyldimethoxysilane and vinylmethyldiethoxysilane.

5. A composition according to claim 4, wherein, in the structural formulas (1) and (2), "a" has a value of 3 to 9, "b" has a value of 0.7 to 1.3, and c has a value of 2 to 5.

6. A composition according to claim 1, wherein said curing agent is selected from the group consisting of a polyisocyanate compound, a melamine-formaldehyde resin, an epoxy compound, a compound having an alkoxysilyl group, a polybasic acid compound, and a compound having a hydroxyl group.

7. A composition according to claim 1, wherein said curing agent is a melamine resin, and said silicone compound is a compound having a structural formula as follows:

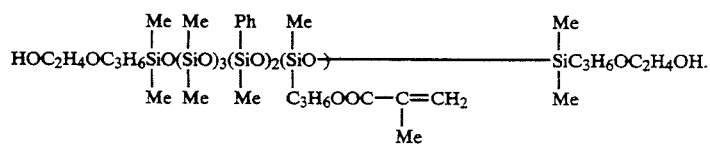

8. A composition according to claim 1, wherein said curing agent is a melamine resin, and said silicone compound is a compound having a structural formula as follows:

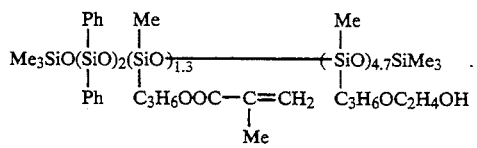

9. A composition according to claim 1, wherein said curing agent is a melamine resin, and said silicone compound is a compound having a structural formula as follows:

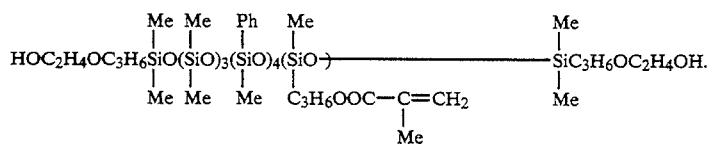

10. A composition according to claim 1, wherein said curing agent is a melamine resin, and said silicone compound is a compound having a structural formula as follows:

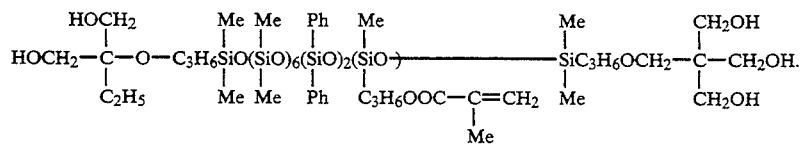

11. A composition according to claim 1, wherein said curing agent is a melamine resin, and said silicone compound is a compound having a structural formula as follows:

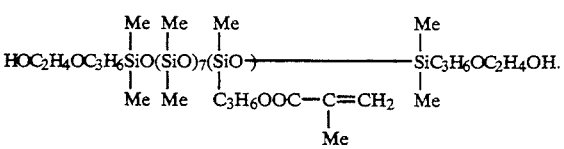

12. A composition according to claim 1, further comprising a crosslink-curing accelerator.

13. A composition according to claim 12, wherein said crosslink-curing accelerator is present in the amount of 0.01 to 3 wt. % based on the weight of the solid portion of the mixture of said copolymer and said curing agent.

14. A composition according to claim 12, wherein said curing agent is a copolymer resin of maleic anhydride, said crosslink-curing accelerator is tetrabutyl ammonium bromide, and said silicone compound is a silicone compound having a structural formula as follows:

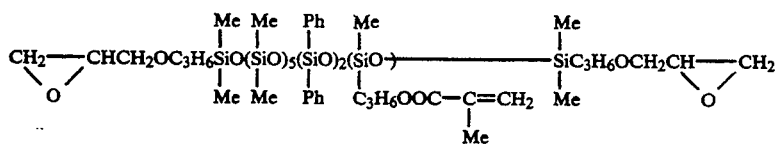

15. A composition according to claim 12, wherein said curing agent is hexamethylenediisocyanate, said crosslink-curing accelerator is dibutyltin dilaurate, and said silicone compound is a silicone compound having a structural formula as follows:

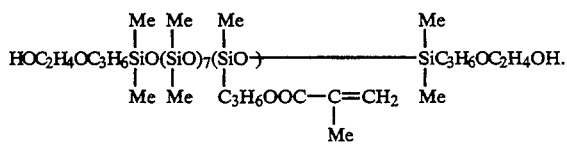

16. A composition according to claim 12, wherein said curing agent is a water soluble methylated melamine resin, said crosslink-curing accelerator is tetrabutyl ammonium bromide, and said silicone compound is a silicone compound having a structural formula as follows:

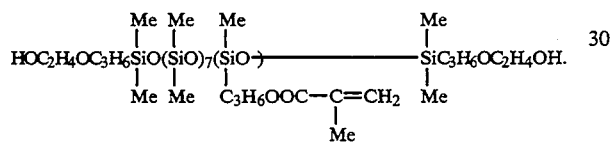

17. A composition according to claim 1, wherein said curing agent is a dibasic anhydride compound.

18. A composition according to claim 1, wherein said curing agent is a compound having a silanol group.

19. A composition according to claim 1, further comprising a solvent.

20. A composition according to claim 1, further comprising a pigment.

21. As a coating, a resin comprising a curing type resin composition said resin composition containing:
a copolymer including a silicone compound and an α,β-unsaturated vinyl monomer, wherein said silicone compound is a silicone compound selected from the group consisting of silicone compounds of structural formula (1), and silicone compounds of structural formula (2) as follows:

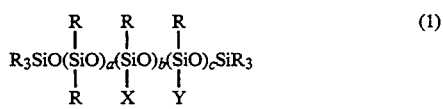

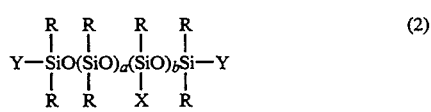

wherein:
X is selected from the group consisting of a 3-acryloxypropyl group and a 3-methacryloxypropyl group;
Y is selected from the group consisting of a 3-glycidoxypropyl group; a 2-(3',4'-epoxycyclohexyl)ethyl group; a 3-hydroxypropy group; a 3-(2'-hydroxyethoxy)propyl group; and a 3-(4'-(3',3'-dihydroxymethyl)butoxy)propyl group, R is selected from the group consisting of a phenyl group and an alkyl group having 1 to 6 carbon atoms; and
a, b, and c are numbers in the following ranges:

$1 \leq a \leq 20$ $0.5 \leq b \leq 2$ $1 \leq c \leq 10$, and
a curing agent, wherein individual molecules of the curing agent include at least two functional groups which are capable of reacting with a functional group in the Y group of said silicone compound.

22. A method of forming a coating, comprising the steps of:
preparing a curing type resin composition containing a copolymer including a silicone compound; an α,β-unsaturated vinyl monomer; and a curing agent, wherein said silicone compound is a silicone compound selected from the group consisting of silicone compounds of structural formula (1), and silicone compounds of structural formula (2) as follows:

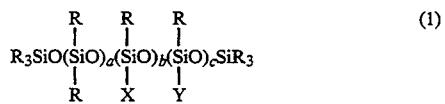

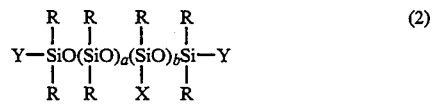

wherein:
X is selected from the group consisting of a 3-acryloxypropyl group and a 3-methacryloxypropyl group,
Y is selected from the group consisting of a 3-glycidoxypropyl group; a 2-(3',4'-epoxycyclohexyl)ethyl group; a 3-hydroxypropyl group; a 3-(2'-hydroxyethoxy)propyl group; and a 3-(4'-(3',3'-dihydroxymethyl)butoxy)propyl group,
R is selected from the group consisting of a phenyl group and an alkyl group having 1 to 6 carbon atoms; and
a, b, and c are numbers in the following ranges:

$1 \leq a \leq 20$ $0.5 \leq b \leq 2$ $1 \leq c \leq 10$, wherein said curing agent includes individual molecules having at least two functional groups which are capable of reacting with a functional group in the Y group of said silicone compound;
diluting said composition with solvent; and
applying the diluted composition to a substrate.

23. A method according to claim 22, further the steps of heating said composition applied to the substrate.

24. A method according to claim 23, wherein said heating step is carried out at a temperature of less than 220° C. for 3 to 60 minutes.

* * * * *